United States Patent [19]

Hindin et al.

[11] 4,217,332

[45] Aug. 12, 1980

[54] PROCESS FOR EXCHANGING HYDROGEN ISOTOPES BETWEEN GASEOUS HYDROGEN AND WATER

[75] Inventors: Saul G. Hindin, Mendham; George W. Roberts, Westfield, both of N.J.

[73] Assignee: Engelhard Minerals & Chemicals Corporation, Iselin, N.J.

[21] Appl. No.: 697,236

[22] Filed: Jun. 17, 1976

[51] Int. Cl.² ............................................. B01D 59/33
[52] U.S. Cl. .................................... 423/249; 423/580; 423/648 A
[58] Field of Search ...................... 423/580, 648, 249

[56] References Cited

U.S. PATENT DOCUMENTS

| 2,690,379 | 9/1954 | Urey et al. | 423/580 |
| 2,787,526 | 4/1957 | Spevack | 423/580 |
| 3,549,323 | 12/1970 | Babcock | 423/648 |
| 3,716,623 | 2/1973 | Bancroft | 423/648 |
| 3,888,974 | 6/1975 | Stevens | 423/580 |

Primary Examiner—Benjamin R. Padgett
Assistant Examiner—Deborah L. Kyle

[57] ABSTRACT

A process for exchanging isotopes of hydrogen, particularly tritium, between gaseous hydrogen and water is provided whereby gaseous hydrogen depeleted in tritium and liquid or gaseous water containing tritium are reacted in the presence of a metallic catalyst.

32 Claims, 8 Drawing Figures

PROCESS FOR EXCHANGING HYDROGEN ISOTOPES BETWEEN GASEOUS HYDROGEN AND WATER

BACKGROUND OF THE INVENTION

This invention is concerned with a process for the exchange of isotopes of hydrogen, particularly tritium, between water and hydrogen gas to form a water effluent enriched in said isotopes and a water effluent depleted in said isotopes.

Tritium, which is the heavy radioactive isotope of hydrogen having a mass of 3, makes up a small proportion of the total hydrogen isotopes of normal water. Tritium atoms are substituted for hydrogen atoms in water to form tritiowater, HTO, and tritium oxide, $T_2O$. Both these substituted forms are referred to collectively as tritiated water.

The supply of tritiated water is constantly renewed as a result of the action of cosmic rays in the upper atmosphere on normal water vapor whereafter under conditions of atmospheric precipitation, both tritiated water and normal water fall as rain. Nuclear explosions also add to the supply of tritium oxide which is present in rain water. Tritiated water is also produced as a result of controlled nuclear reactions in the presence of normal water.

Removal of substantial amounts of tritiated water from normal water in nuclear reactor effluent and in the effluent from facilities which process nuclear fuels is an important problem for which no satisfactory solution currently exists. In the event of an accidental release of tritium within the "glove boxes" in which nuclear fuels are processed for example, current practice is to take the purge air stream containing the tritium gas into a catalytic reactor to oxidize the tritium and tritiated hydrocarbons to normal water and tritiated water, and then absorb the normal and tritiated water on a desiccant such as molecular sieves. The desiccant is regenerated by heating in the presence of dry helium and the resulting water vapor is then adsorbed on another batch of desiccant at liquid nitrogen temperatures. This latter desiccant when essentially saturated with water, is very highly radioactive and is either disposed of or stored.

There is a need to improve the present process of separating substantial amounts of tritiated water from normal water. At the very least, an improved separation would allow a smaller amount of desiccant to be used in absorbing tritiated water from the gases leaving the first two desiccant beds during the regeneration step of the nuclear reaction effluent. Further, an improved separation would allow tritiated water to be isolated from reactor effluent and even from normal water in a form concentrated enough for sale or other use.

The tritiated water isolated can be used in a number of applications such as in kinetic studies in aqueous media and in biological studies. It is expected that ionized tritium will be used as a reactant with ionized deuterium to form helium in controlled thermonuclear fusion reactors now under development for the production of enormous amounts of energy, since the tritium-deuterium reaction takes place at the lowest temperature of any of the various fusion reactions, i.e. deuterium-hydrogen or deuterium-deuterium.

In the past, several processes have been described for exchanging hydrogen isotopes between liquid water and a hydrogen containing gas. In U.S. Pat. No. 2,690,379 to Urey et al., processes for accelerating hydrogen isotope exchange reactions between liquid water or water vapor and hydrogen gas are desribed using certain supported metal catalysts. The Urey et al. patent describes several counter-current and co-current hydrogen exchange systems which are promoted by those catalysts.

In U.S. Pat. No. 2,787,526 to Spevack, a process for concentrating deuterium in water using liquid water and hydrogen sulfide gas in counter-current flow is provided employing reactors which operate at different temperatures.

In U.S. Pat. No. 3,888,974 to Stevens, a process for hydrogen isotope exchange and concentration between liquid water and hydrogen gas is described. The process comprises contacting between 15° C. and 70° C. in a first catalytic zone, feed water and hydrogen gas from a second catalytic zone, and in counter-current flow contacting at a temperature in the range of 150° C. to 200° C. in a second catalytic zone, pressurized to keep water liquified, the liquid water phase from the first zone and the hydrogen gas withdrawn from the first zone with a catalyst comprising a Group VIII metal. In the first zone, a hydrogen isotope such as deuterium is exchanged into and concentrated in the liquid water in the first zone. In the second zone, the hydrogen isotope is exchanged from the water and concentrated in the hydrogen gas withdrawn from the second zone.

The catalyst used in both reactor zones according to Stevens comprises a catalytically active metal of Group VIII and having an organic resin or polymer coating thereon permeable to water vapor and hydrogen gas and impermeable to liquid phase water. Actual hydrogen isotope exchange does not occur directly between the water in liquid form and the gaseous hydrogen even though liquid water and gaseous hydrogen are brought together in the presence of the catalyst; col. 1, lines 18 to 22.

These prior methods suffer from certain disadvantages. The catalysts of the Urey et al. patent are rapidly deactivated in the presence of liquid water and thus cannot be used in a low temperature reactor with water in the liquid state. The process described in the Stevens patent is chiefly designed for the separation of deuterated water from normal ground water. High pressures are required in the second catalytic zone in order to maintain the water in a liquid state. According to the Stevens patent, the preferred operating temperature of the second catalytic zone is 150° C. to 200° C. For such temperature, the system operating pressure is in the region of about 500 to 6000 psig. These operating conditions are not practical for handling tritiated water because of the risk of leaks and consequent environmental problems. Such is not the case with deuterium which is not radioactive and therefore the engineering problems associated with handling deuterium are significantly less than those associated with tritium. With tritium, all process equipment must be essentially free of leakage. Because the rate of a leak is essentially directly proportional to the pressure, there is need for developing a tritium separation process which can operate at the lowest possible pressure and still achieve efficient exchange of tritium between liquid water and hydrogen gas, preferably not much above atmospheric pressure.

The process of this invention employs at least one high temperature zone and at least one low temperature zone for contacting hydrogen gas and water and is characterized by the following features:

(a) the isotope exchange in the high temperature zone can (1) be carried out at about atmospheric pressure while maintaining all reactants in the gas phase such that a wide selection of catalysts can be easily specified which under these conditions have a longer process life; or (2) can be carried out at relatively low pressures while maintaining water in the liquid phase;

(b) the process permits the use of equipment which can be easily designed for operation of the high and low temperature zones to prevent radioactive tritium leakage from the system;

(c) the tritiated feed water may optionally be split to both the high and low temperature zones, or may be introduced into either the low temperature zone or the high temperature zone; and (d) the catalysts employed in the zones where liquid water exists are relatively slowly deactivated.

The present invention provides a novel and efficient method for the exchange of isotopes of hydrogen, particularly tritium, between water and hydrogen gas to form a water effluent enriched in said isotopes and a water effluent depleted in said isotopes.

SUMMARY OF THE INVENTION

It is an object of this invention to provide an efficient method for the exchange of isotopes of hydrogen, particularly tritium, between water and hydrogen gas.

It is a further object of this invention to provide a method for the separation and concentration of said isotopes in liquid water.

These objects are accomplished by a method which comprises the steps of:

(a) (i) introducing hydrogen gas depleted in tritium, and water in the vapor phase, said water containing tritium, into a first reaction zone, contacting in said zone in co-current flow at a temperature in the range of from about 225° C. to about 300° C. said water vapor and hydrogen gas with a supported metal catalyst, withdrawing from said zone an effluent stream comprising a mixture of hydrogen gas enriched in tritium and water vapor depleted in tritium, and condensing said water vapor to liquid water; or (a) (ii) introducing hydrogen gas depleted in tritium, and liquid phase water, said water containing tritium, into a first reaction zone, contacting in said zone in counter-current flow at a temperature of about 100° C. said liquid phase water and hydrogen gas with a hydrophobic catalyst comprising a coherent film of a hydrophobic polymer, said film being disposed on a low surface area support and containing at least one finely divided catalytically active metal of Group VIII of the Periodic Table on a high surface area carrier and withdrawing from said first reaction zone a stream of hydrogen gas enriched in tritium and liquid water depleted in tritium; and (b) introducing said hydrogen gas enriched in tritium withdrawn from said first reaction zone and liquid water containing tritium into a second reaction zone, contacting in said second reaction zone in counter-current flow at a temperature in the range from about 0° C. to about 50° C. said liquid water and said hydrogen gas enriched in tritium with a hydrophobic catalyst comprising a coherent film of a hydrophobic polymer, said film being disposed on a low surface area support and containing at least one finely divided catalytically active metal of Group VIII of the Periodic Table on a high surface area carrier, and withdrawing from said second reaction zone a liquid water effluent stream enriched in tritium and a hydrogen gas depleted in tritium.

The hydrogen gas depleted in tritium from step (b) is normally used as the hydrogen gas in step (a) (i) or (a) (ii) to operate the method continuously.

The present method may be employed for the exchange of either of the heavy hydrogen isotopes, deuterium and tritium. However it is particularly and preferably applicable to tritium exchange between water and hydrogen gas. For this reason, the specification will deal primarily with tritium, it being understood that deuterium exchange may also be accomplished using the present method.

As used herein, the term "hydrogen gas depleted in tritium" means a hydrogen gas containing a lower tritium concentration after a given low temperature exchange reaction than before the same low temperature exchange reaction and includes start-up or make up hydrogen gas. The term "hydrogen gas enriched in tritium" means hydrogen gas containing a greater tritium concentration after a given high temperature reaction than before said high temperature reaction. The terms "liquid water enriched in tritium" or "water vapor enriched in tritium" means water in either the liquid or vapor phase more concentrated in tritium after a given low temperature reaction than before said low temperature reaction. The term "liquid water depleted in tritium" or "water vapor depleted in tritium" means water in either the liquid or vapor phase less concentrated in tritium after a given high temperature reaction than before the high temperature reaction.

In the present method, using a feed containing tritiated water, tritium is exchanged for hydrogen from a hydrogen gas in a high temperature-low pressure zone to increase the concentration of tritium in the hydrogen gas and to reduce the concentration of tritium in the water. The hydrogen gas enriched in tritium from the high temperature zone and liquid water are introduced into a low temperature zone where tritium in the hydrogen gas is exchanged for hydrogen in the liquid water. Thus, a water effluent depleted in tritium relative to the tritiated water feed and a hydrogen gas enriched in tritium is formed in the high temperature zone while a water effluent enriched in tritium relative to the tritiated water feed and a hydrogen gas depleted in tritium is formed in the low temperature zone. The hydrogen gas depleted in tritium is introduced into the high temperature zone for further exchange of hydrogen of tritium and so the process operates continuously using the water feed and hydrogen gas which gas is cycled continuously through both high and low temperature zones, the hydrogen gas becoming enriched in tritium as it contacts tritiated water in the high temperature zone and becoming depleted in tritium as it contacts tritiated water in the low temperature zone. The water effluent enriched in tritium may be separated after the exchange in the low temperature zone and the water effluent depleted in tritium may be separated after the high temperature zone.

By employing a plurality of stages, each stage comprising a high and a low temperature zone, tritium can be more highly concentrated in a water effluent which is easily separable from one of the low temperature zones. Conversely a liquid water effluent substantially depleted in tritium can be separated from one of the high temperature zones.

The reaction in the low temperature zone should be conducted at temperatures ranging from 0° C. to 50° C., and preferably from 20° C. to 25° C. The flow can be co- or counter-current but preferably counter-current. The pressures may vary from atmospheric pressure to several hundred pounds per square inch, but preferably from 1-10 psig.

The operation of the high temperature zone is referred to in steps (a) (i) and (ii) above and the operation of the low temperature zone is referred to by step (b). When starting up the process, hydrogen gas is supplied to the high temperature zone. Subsequently, the hydrogen gas depleted in tritium from the low temperature zone is thereafter used as the hydrogen gas in the high temperature zone. If necessary, make-up hydrogen gas can be introduced into the high temperature zone.

The exchange in the high temperature zone of the present method may be carried out in one of two manners.

In one manner as provided in step (a) (i) above, the water feed is first vaporized to form super-heated vapors and these vapors are contacted with hydrogen gas in co-current flow at temperatures of from about 225° C. and 300° C. at about 1-10 psig in the presence of a supported metal catalyst.

After tritium in the water vapor is exchanged for hydrogen in the hydrogen gas, the gaseous mixture of hydrogen enriched in tritium and water vapor depleted in tritium is withdrawn from the high temperature zone and the water vapor is condensed to liquid water. The hydrogen gas is introduced into the low temperature zone. At least a portion of the liquid water is separated from the process and the remaining water, if any, is introduced into the low temperature zone to exchange hydrogen in the water for tritium in the tritium enriched hydrogen gas. This manner of operating the high temperature zone will be often referred to in the specification as "co-current".

In another manner of operating the high temperature zone as provided in step (a) (ii) above, the water feed is used in the liquid state where it contacts hydrogen gas at a temperature of about 100° C. in the presence of a hydrophobic catalyst which will be described in more detail below. Preferably the flow is counter-current, but co-current flow may also be used. The pressure in the high temperature zone may be varied to adjust the relative amounts of water in the hydrogen gas withdrawn from this zone which amounts should generally be low. By avoiding substantial vaporization of water, more efficient separation of the hydrogen is achieved and undue heat loads on the apparatus used to cool the hydrogen between the high temperature zone and the low temperature zone are avoided. The hydrogen gas enriched in tritium is then introduced into the low temperature zone. At least a portion of the liquid water depleted in tritium from the high temperature zone is separated from the process and the remaining liquid water, if any, is introduced into the low temperature zone. This manner of operating the high temperature zone will be often referred to in the specification as "counter-current".

The present process makes use of the fact that the equilibrium constant (Keq) for the reversible reaction of Equation 1 below decreases significantly with increasing temperature.

Equation (1)

$$H_2O + HT \rightleftharpoons HTO + H_2$$

$$K_{eq} = \frac{[HTO][H_2]}{[H_2O][HT]}$$

Table I below gives the values of the theoretical equilibrium constant of Equation (1) at various temperatures.

TABLE I

| EQUILIBRIUM CONSTANT FOR THE REACTION HT + $H_2O$ ⇌ $H_2$ + HTO | |
|---|---|
| Temperature, °C. | Theoretical Equilibrium Constant |
| 16.0 | 6.47 |
| 20.2 | 6.24 |
| 25.0 | 6.01 |
| 56.2 | 4.84 |
| 79.6 | 4.23 |
| 111.2 | 3.64 |
| 158.4 | 3.03 |
| 217.1 | 2.54 |
| 302.9 | 2.08 |

At temperatures between about 0° C. and 50° C., Keq has a value of between about 5 and 7. Thus at low temperatures the equilibrium of Equation (1) is shifted toward the right, that is toward the formation of HTO and $H_2$. At temperatures of between about 200° C. and 300° C., Keq has a value of between about 2 and 3. Thus at all temperatures, the equilibrium is shifted to the right but at high temperatures less favorably toward formation of HTO and $H_2$ than at low temperatures.

A non-hydrophobic catalyst which may be employed in the high temperature zone for tritium exchange in the vapor phase (co-current) comprises one or more finely divided catalytically active metals of Groups VI, VII, or VIII of the Periodic Table on a suitable substrate which substrate will not adversely affect the exchange and which will stabilize the catalytically active metal incorporated in it. Such catalytically active metals include nickel, cobalt, iron, rhodium, palladium, osmium, tungsten, platinum, iridium, molybdenum and rhenium, and mixtures thereof. Suitable substrates include silica, alumina, carbon, charcoal, kiesulguhr and chromium oxide. Generally the catalysts should contain from about 0.01 to 5% by weight of the catalytically active metal or metals. The catalyst can also be the hydrophobic catalyst discussed below although it is not required. As used herein, the term "supported metal catalyst" includes the non-hydrophobic catalyst above as well as the hydrophobic catalyst.

In the zones where liquid water is present the invention employs a hydrophobic catalyst which catalyst is relatively slowly deactivated in the presence of liquid water. This hydrophobic catalyst is employed in the low temperature zone and in the high temperature zone using liquid water [step (a) (ii)] at about 100° C. Optionally this catalyst may be used in the high temperature zone operated in the co-current manner. The catalyst comprises an inert low surface area support coated with a film of hydrophobic polymer containing one or more finely divided catalytically active metals of Group VIII of the Periodic Table on a high surface area carrier. This catalyst will be referred to as a single film hydrophobic catalyst. The preferred hydrophobic catalyst however is a double-filmed catalyst comprising a low surface area support, a first coherent film of a hydrophobic polymer on the low surface area support and a second coherent film of a hydrophobic polymer on the first film, the second film containing a finely-divided catalytically active metal of Group VIII of the Periodic Table on a high surface area carrier. The low surface area support can be an inert material having a surface area of 5 m²/g. or less such as alumina, mullite, cordierite, zirconia, silica, silica gel, chromia, molybdenum oxide, tungstic oxide, nickel oxide, and kiesulguhr. The high surface area carrier can be porous materials having a surface area of 50 m²/g. or greater such as carbon, activated alumina and silica for example. The hydrophobic polymers are those which are permeable to water vapor but substantially impermeable to liquid water to protect the catalyst from degradation by liquid water. These polymers include polytetrafluoroethylene, polyalkyl silicones, polyethylene, polypropylene or similar hydrophobic polymers of medium to high molecular weight. The catalytically active metal is at least one metal selected from Group VIII of the Periodic Table, in particular platinum, nickel, iridium and rhodium, and may include combinations thereof. Platinum is the preferred catalytically active metal because of its high activity.

The single film coated hydrophobic catalyst can be prepared by first depositing the Group VIII metal on the high surface area carrier in accordance with techniques well known in the art and then mixing the supported catalyst with an emulsion or suspension of the hydrophobic polymer, in an amount sufficient to completely coat the support. This mixture is then applied to the low area support, dried and calcined to form the catalyst.

In preparing the double-filmed catalyst, the low surface area support is first coated with a hydrophobic polymer which is then dried and calcined. The catalytically active metal is well-dispersed on the high surface area carrier and then slurried with a suspension of a hydrophobic polymer which may be the same or different than the polymer used to coat the low surface area support. The coated low surface area support is then coated with the suspension, dried and calcined. The amount of metal employed should be sufficient to give a final metal content of from about 0.01% to about 5.0%, preferably from about 0.02 to about 2.0% based on the total catalyst. The amount of catalytically active metal based on the weight of high surface area carrier is from about 1% to 25% and preferably 3% to 12%. The preferred shape of the finished catalyst should be such as to provide high void volume and high superficial surface area, such as Pall rings, Berl saddles and Intalox saddles.

The composition, amount and shape of the catalyst may be varied to meet operating conditions of the tritium exchange reactions, e.g. temperature, vapor-liquid gas ratio, and space velocity. For optimum performance a catalyst should have an activity which is sufficiently great to approach 90% of equilibrium for the exchange of tritium between liquid water and hydrogen gas when using counter-current flow at 25° C. at a gas-liquid weight ratio of 0.6 or less and at a volume hourly space velocity of 200 hr.$^{-1}$ or greater based on the gas, and the stability of which is such that it is relatively slowly deactivated in the presence of liquid water.

A particularly preferred hydrophobic catalyst for the invention comprises a low surface area alumina support coated with a first film of polytetrafluoroethylene, and a second film of polytetrafluoroethylene containing finely-divided platinum on finely-divided high surface area carbon particles as a carrier.

In preparing the preferred catalyst, the inert low surface area support is first coated with polytetrafluoroethylene, which is then dried in an air stream and calcined at a temperature of about 350° C. Platinum is dispersed on finely divided carbon such as by formate reduction of chloroplatinic acid and then slurried with a polytetrafluoroethylene suspension preferably in the presence of a plasticizer such as methyl cellulose. The low surface area support is then coated with the suspension, dried and calcined. The amount of polytetrafluoroethylene used is from about 2 to 20 weight percent and preferably 5 to 15 weight percent of the platinum-carbon particles. In this procedure the polytetrafluoroethylene serves both as a binder for the platinum-carbon particles as well as a sealant which prevents liquid water from contacting the platinum-carbon catalytic surface. The relative sizes of the carbon pores and the second polytetrafluoroethylene emulsion are selected so that the polytetrafluoroethylene emulsion coats the carbon rather than entering the pores of the carbon particles.

The polytetrafluoroethylene emulsion has a particle size larger than the pore size of the carbon particles. The carbon particles have a pore size of from 15 to 300 Å in diameter. The polytetrafluoroethylene is used in an amount which is sufficient to provide a coherent film over the surface of the low surface area support.

DETAILED DESCRIPTION OF THE PREFERRED EMBODIMENTS

Figure 1:
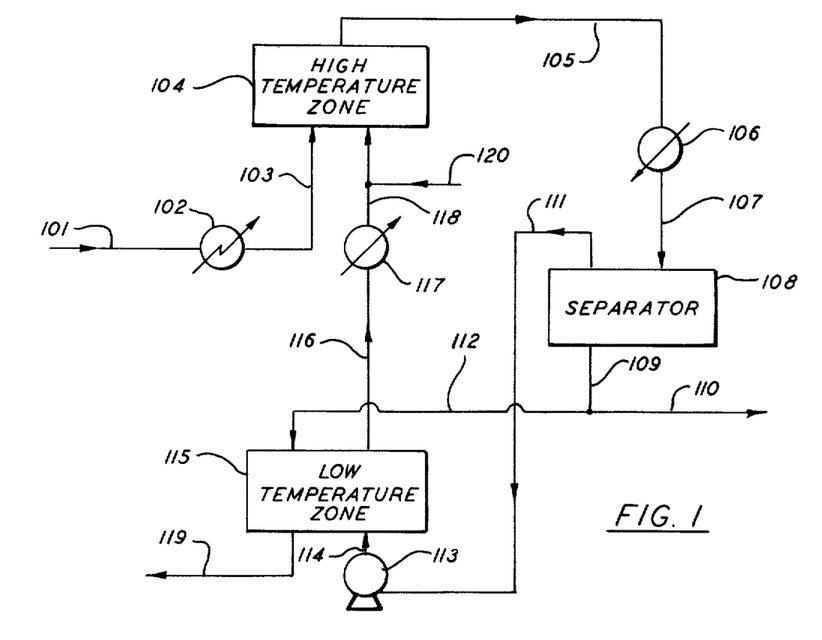
FIG. 1 is a flow sheet of a single stage embodiment of the present method having one high temperature zone and one low temperature zone wherein all liquid water feed containing tritium is introduced into a high temperature zone in the vapor state to contact hydrogen gas at temperatures between about 225° C. to 300° C. (co-current)

In the process of FIG. 1, a liquid water feed containing tritium is led in line 101 to vaporizer 102 where the water is vaporized, superheated and then led in line 103 to high temperature zone 104. The high temperature zone 104 contains a fixed bed of supported metal catalyst particles over which the water vapor from line 103 passes in co-current flow with hydrogen gas depleted in tritium in line 118 withdrawn from low temperature zone 115. For initial start up of the process an external source of hydrogen gas is introduced into the high temperature zone from line 120 into line 118. After the water vapor and hydrogen gas are contacted in the high temperature zone 104 at from about 225° C. to 300° C. at pressures of from about 1-10 psig in the presence of a supported metal catalyst, the effluent comprising a gaseous mixture of hydrogen gas enriched in tritium and water vapor depleted in tritium is withdrawn in line 105 to condensor 106 where only the water vapor is condensed. The condensed water vapor and hydrogen gas enriched in tritium are led in line 107 to gas/liquid separator 108 to separate the tritium-enriched hydrogen gas and liquid water depleted in tritium. The hydrogen gas is withdrawn from separator 108 in line 111 and introduced into low temperature zone 115 via compressor 113 and inlet line 114. The liquid water leaves separator 108 through line 109 and is split into lines 110 and 112. The water depleted in tritium in line 110 is withdrawn from the process. The water depleted in tritium in line 112 enters the low temperature zone 115 in counter-current flow to the hydrogen gas depleted in tritium. The low temperature zone 115 contains a fixed bed of hydrophobic catalyst particles comprising a low surface area alumina support coated with a first film of polytetrafluoroethylene and a second film of polytetrafluoroethylene containing finely divided platinum on high surface area carbon particles. The water and hydrogen gas are contacted at temperatures of between 0° and 50°, preferably at 25° C., at pressures of about 1-10 psig. In the low temperature zone, tritium is concentrated in the liquid water by exchange of hydrogen for tritium in the tritium enriched hydrogen gas. The hydrogen gas depleted in tritium passes via line 116, preheater 117, and line 118 to the high temperature zone 104. The liquid water enriched in tritium is separated from the low temperature zone 115 via line 119.

Figure 2:
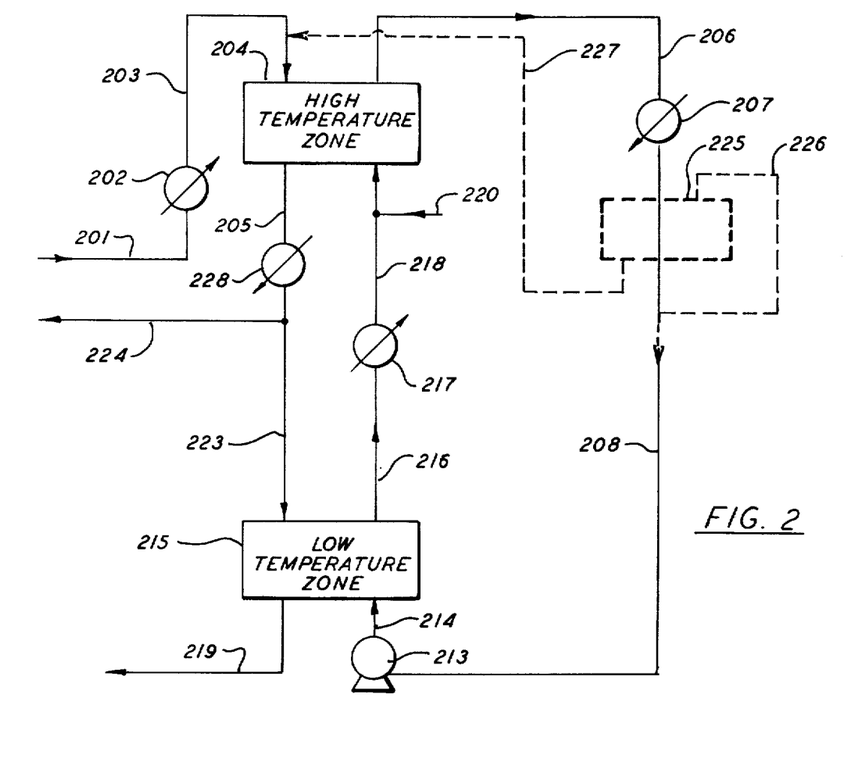
FIG. 2 is a flow sheet of a single stage embodiment of the present method wherein all liquid water feed containing tritium is introduced into a high temperature zone in the liquid state to contact hydrogen gas at a temperature of about 100° C. (counter-current).

In the process of FIG. 2, the liquid water feed in line 201 is heated in preheater 202 to a temperature of about 100° C. and introduced into high temperature zone 204 via line 203 in the liquid state to contact hydrogen gas from line 218 in counter-current flow in the presence of the hydrophobic catalyst described with respect to the process of FIG. 1 in the low temperature zone 115. Hydrogen gas enriched in tritium is withdrawn from the high temperature zone 204 in line 206 and is cooled in condensor 207 whereafter it is introduced into the low temperature zone 215 via line 208 compressor 213 and inlet line 214. A gas/liquid separator arrangement indicated by the dotted lines in FIG. 2 may optionally be employed between the condensor 207 and line 208 to separate liquid water depleted in tritium which may be present in the hydrogen gas effluent withdrawn from the high temperature zone 204 from the hydrogen gas before it enters the low temperature zone 215. In this case, the gaseous effluent in line 206 enters condensor 207 where only the water vapor is condensed. The condensed water vapor and hydrogen gas enriched in tritium leaving the condensor are then separated in gas/liquid separator 225. Hydrogen gas enriched in tritium is withdrawn from the separator in line 226 and is then led to line 208. The condensed water vapor is withdrawn from the separator in line 227 where it is combined with the liquid water feed in line 203 entering the high temperature zone 204. The liquid water depleted in tritium withdrawn from the high temperature zone 204 in line 205 is cooled in cooler 228 and then split into lines 223 and 224. The portion of the liquid water depleted in tritium in line 224 is separated from the process. The portion of liquid water in line 223 is introduced into the low temperature zone 215 where it contacts the hydrogen gas from line 214 in counter-current flow under the conditions as described with respect to FIG. 1 above. The liquid water enriched in tritium from the low temperature zone is separated from the process via line 219. The hydrogen gas depleted in tritium from the low temperature zone 215 is led in line 216 to preheater 217 and into the high temperature zone 204. Make up hydrogen gas can be introduced to the high temperature zone via line 220.

Figure 3:
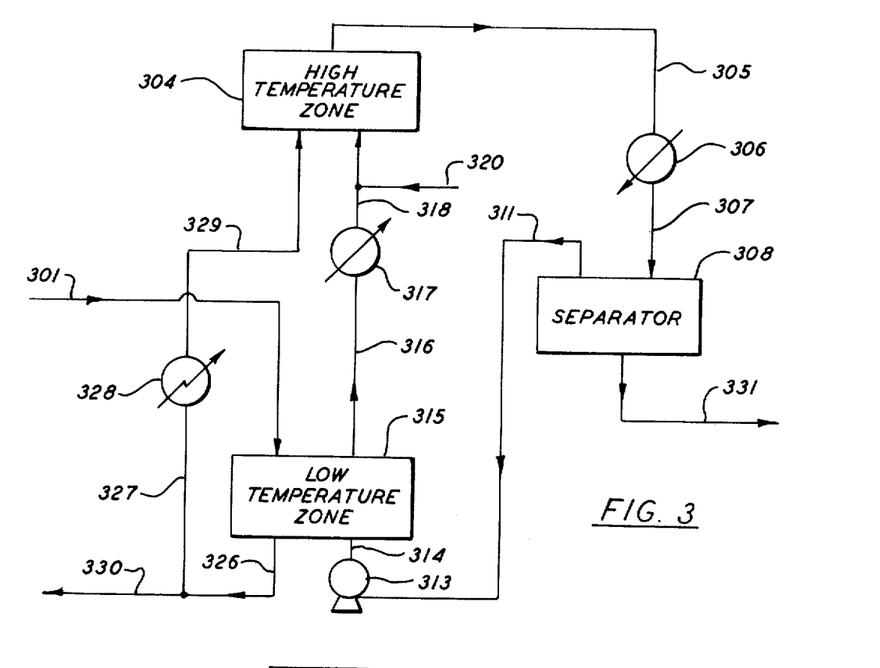
FIG. 3 is a flow sheet of a single stage embodiment of the present method wherein all liquid water feed containing tritium is introduced into a low temperature zone in the liquid state and a portion of the liquid water withdrawn from the low temperature zone is vaporized and introduced into a high temperature zone to contact hydrogen gas at temperatures between about 225° C. to 300° C.

In the process of FIG. 3 a liquid water feed containing tritium in line 301 is led to low temperature zone 315 where it contacts hydrogen gas enriched in tritium from line 314 in counter-current flow at temperatures from 0° C. to 50° C. and at from about 1-10 psig in the presence of the hydrophobic catalyst described with respect to FIG. 1. The liquid water enriched in tritium is withdrawn from the low temperature zone 315 via line 326 where it is split into lines 327 and 330. The liquid water in line 327 is vaporized in vaporizer 328 and this vapor enriched in tritium is introduced into the high temperature zone 304 via line 329 where it is contacted in co-current flow with hydrogen gas depleted in tritium from low temperature zone 315 via line 316, preheater 317 and line 318. Line 320 is used for start up or make-up hydrogen gas. The liquid water effluent enriched in tritium in line 330 is removed from the process. The exchange in the high temperature zone is carried out under the conditions described with respect to FIG. 1. The gaseous mixture of hydrogen gas enriched in tritium and water vapor depleted in tritium is led in line 305 to condensor 306 whereafter the condensed water vapor and hydrogen gas enriched in tritium is led in line 307 to separator 308. The hydrogen gas is withdrawn from the separator through line 311 to enter the low temperature zone via compressor 313 and inlet line 314. The liquid water depleted in tritium is removed from the process via line 331.

Figure 4:
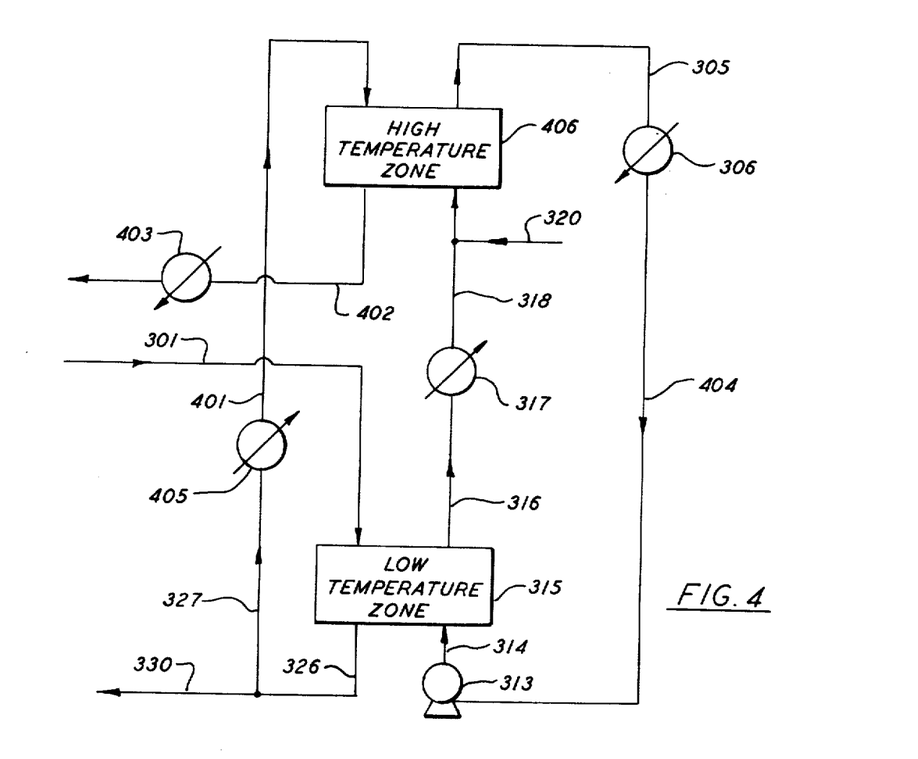
FIG. 4 is a flow sheet of a single stage embodiment of the present method wherein all liquid water feed containing tritium is introduced into a low temperature zone and a portion of the liquid water withdrawn from the low temperature zone is introduced into a high temperature zone to contact hydrogen gas at a temperature of about 100° C.

The process of FIG. 4 is similar to the process of FIG. 3 except that the liquid water withdrawn from the low temperature zone 315 in line 327 is heated in preheater 405 and introduced into high temperature zone 406 via line 401 in the liquid state at about 100° C. where it is contacted with hydrogen gas from line 318 in counter-current flow under the conditions described with respect to FIG. 2. The hydrogen gas enriched in tritium is withdrawn from the high temperature zone 304 via line 406, cooled in condensor 306 and then is introduced into the low temperature zone 315 via line 404, compressor 313 and inlet line 314. Liquid water depleted in tritium is withdrawn from high temperature zone 406 via line 402 to cooler 403 whereafter it is separated from the process. A gas/liquid separator arrangement as shown in FIG. 2 may be employed between condensor 306 and line 404 for separation of water vapor depleted in tritium contained in the hydrogen gas and to return the separated water vapor to the high temperature zone.

Figure 5:
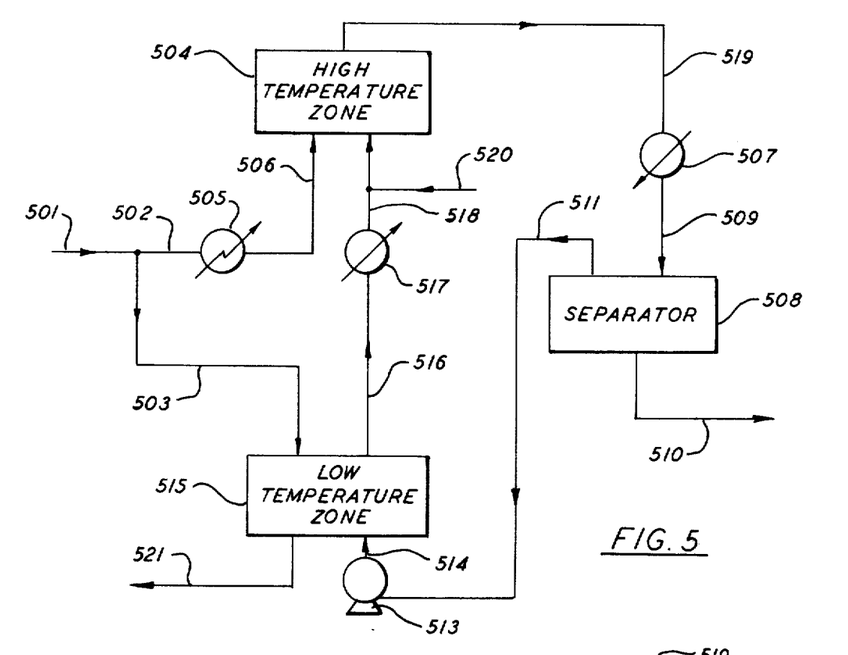
FIG. 5 is a single stage embodiment of the present invention wherein the liquid water feed containing tritium is split to both a high temperature zone and a low temperature zone, the feed entering the high temperature zone in the vapor phase and contacting hydrogen gas at temperatures between about 225° C. and 300° C.

In the process of FIG. 5 a liquid water feed containing tritium in line 501 is split into two lines, 502 and 503. Line 502 passes through vaporizer 505 where the liquid feed is vaporized, superheated and then introduced into high temperature zone 504 via line 506 where it contacts hydrogen gas depleted in tritium in co-current flow from line 518 under the conditions outlined in FIG. 1. The mixture of water vapor depleted in tritium and the hydrogen gas enriched in tritium exits the high temperature zone 504 in line 519 and is cooled to condense the water vapor in condensor 507 and then introduced into a gas/liquid separator 508 via line 509 where the liquid water depleted in tritium is separated from the system in line 510. The hydrogen gas enriched in tritium in line 511 is introduced into the low temperature zone 515 via compressor 513 and line 514.

The tritium-rich gas passes over the catalyst in the low temperature zone in counter-current flow to the liquid feed entering the zone through line 503 whereby the tritium in the hydrogen gas is exchanged for hydrogen in the liquid water feed at temperatures of about 0° to 50° C. A water effluent enriched in tritium is withdrawn from the low temperature zone in line 521. The hydrogen gas depleted in tritium is withdrawn from low temperature zone 515 via line 516 where it is heated in preheater 517 and introduced into the high temperature zone via line 518 to contact the vaporized liquid water from line 506.

Figure 6:
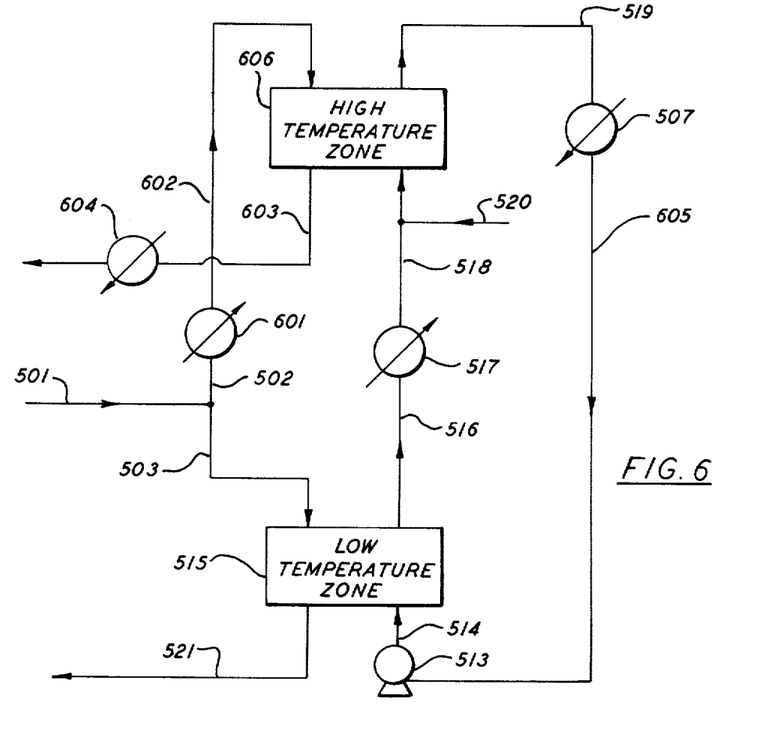
FIG. 6 is a single stage embodiment of the present invention wherein the liquid water feed containing tritium is split to both a high temperature zone and a low temperature zone, the feed entering the high temperature zone in the liquid phase at temperatures of about 100° C.

The process of FIG. 6 is similar to the process of FIG. 5 except that liquid water in line 502 is heated in preheater 601 and introduced into high temperature zone 606 via line 602 in the liquid state in counter-current flow to the hydrogen gas from line 518 at a temperature of about 100° C. in the presence of the hydrophobic catalyst as described with respect to FIG. 2. The liquid water depleted in tritium from the high temperature zone 606 is separated from the hydrogen gas enriched in tritium via line 603 and cooled in cooler 604 before leaving the process. The tritium enriched hydrogen gas is withdrawn from the high temperature zone 606 in line 519, cooled in condensor 507 and is introduced into the low temperature zone 515 via line 605, compressor 513 and inlet line 514. If desired, a gas/liquid separator arrangement as described with respect to FIG. 2 can be inserted between condensor 507 and line 605 to remove water depleted in tritium contained in the hydrogen gas enriched in tritium withdrawn from the high temperature zone 606.

Figure 7:
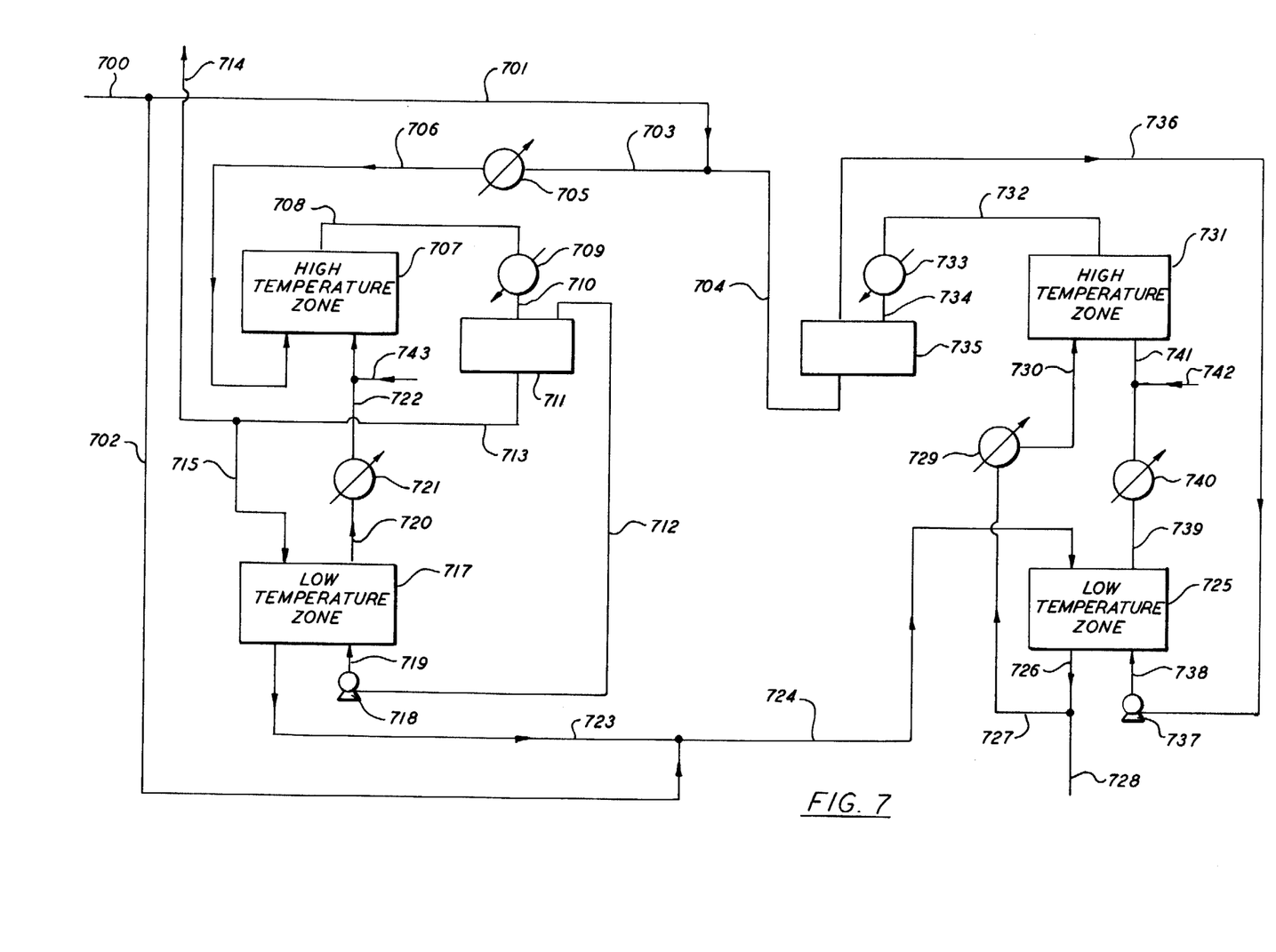
FIG. 7 is a two stage embodiment of the present invention comprising two high temperature zones and two low temperature zones. The liquid water feed containing tritium is split to enter one low temperature zone and one high temperature zone. The high temperature exchange reactions take place with water in the vapor phase contacting hydrogen gas at temperatures between about 225° C. and 300° C.

In the process of FIG. 7, liquid water feed containing tritium in line 700 is split into lines 701 and 702. The feed water in line 701 and liquid water depleted in tritium in line 704 are combined in line 703, vaporized and superheated in vaporizer 705 and introduced into a first high temperature zone 707 via line 706 where the vapor contacts hydrogen gas in co-current flow at temperatures from 225° C. to 300° C. at 1–10 psig in the presence of a supported metal catalyst. The gaseous mixture of hydrogen gas enriched in tritium and water vapor depleted in tritium is withdrawn from the high temperature zone 707 via line 708 to condensor 709 where only the water vapor is condensed. The liquid water and hydrogen gas is led in line 710 to separator 711 where the hydrogen gas is separated from the condensed water and is withdrawn in line 712. The condensed water depleted in tritium leaves the separator in line 713. A portion of this liquid water substantially depleted in tritium is separated from the process via line 714. Another portion is introduced into a first low temperature zone 717 via line 715 where it contacts hydrogen gas enriched in tritium which enters the low temperature zone 717 via line 712, compressor 718 and inlet line 719. The water depleted in tritium and hydrogen gas are contacted in counter current flow at a temperature between about 0° and 50° C. at 1–10 psig in the presence of the hydrophobic catalyst as previously described. The hydrogen gas depleted in tritium from the first low temperature zone 717 is introduced into the first high temperature zone 707 via line 720 preheater 721 and inlet line 722. The liquid water enriched in tritium after exchange is withdrawn from the low temperature zone via line 723 where it is combined with incoming liquid water feed containing tritium from line 702 in line 724. The water feed in line 724 enters a second low temperature zone 725 where it contacts hydrogen gas enriched in tritium from line 738 in counter-current flow under the same conditions as in the low temperature zone 717. Liquid water now highly enriched in tritium is separated from second low temperature zone 725 via line 726 where a portion is separated from the system in line 728. Another portion is led in line 727 to vaporizer 729 where it is vaporized, superheated and introduced via line 730 to second high temperature zone 731. The water vapor contacts hydrogen gas from line 741 in co-current flow under the same conditions as in the first high temperature zone 707. The gaseous mixture withdrawn from the second high temperature zone in line 732 is condensed to liquify the water vapor depleted in tritium in condensor 733. The condensed water depleted in tritium and hydrogen gas enriched in tritium is led to separator 735 via line 734 to separate the condensed water and hydrogen gas. Hydrogen gas via line 736 enters the second low temperature zone 725 via compressor 737 and inlet line 738 to contact incoming liquid water from line 724. The hydrogen gas depleted in tritium leaves the second low temperature zone via line 739, is heated in preheater 740 and enters the second high temperature zone 731 via line 741. External hydrogen gas may be introduced from line 742 into line 741 for start-up purposes or if make-up hydrogen gas is necessary. Similarly, make-up or start-up hydrogen gas may also be introduced from line 743 into line 722. The liquid water depleted in tritium leaves separator 735 via line 704 and combines with incoming liquid water containing tritium from line 701.

Figure 8:
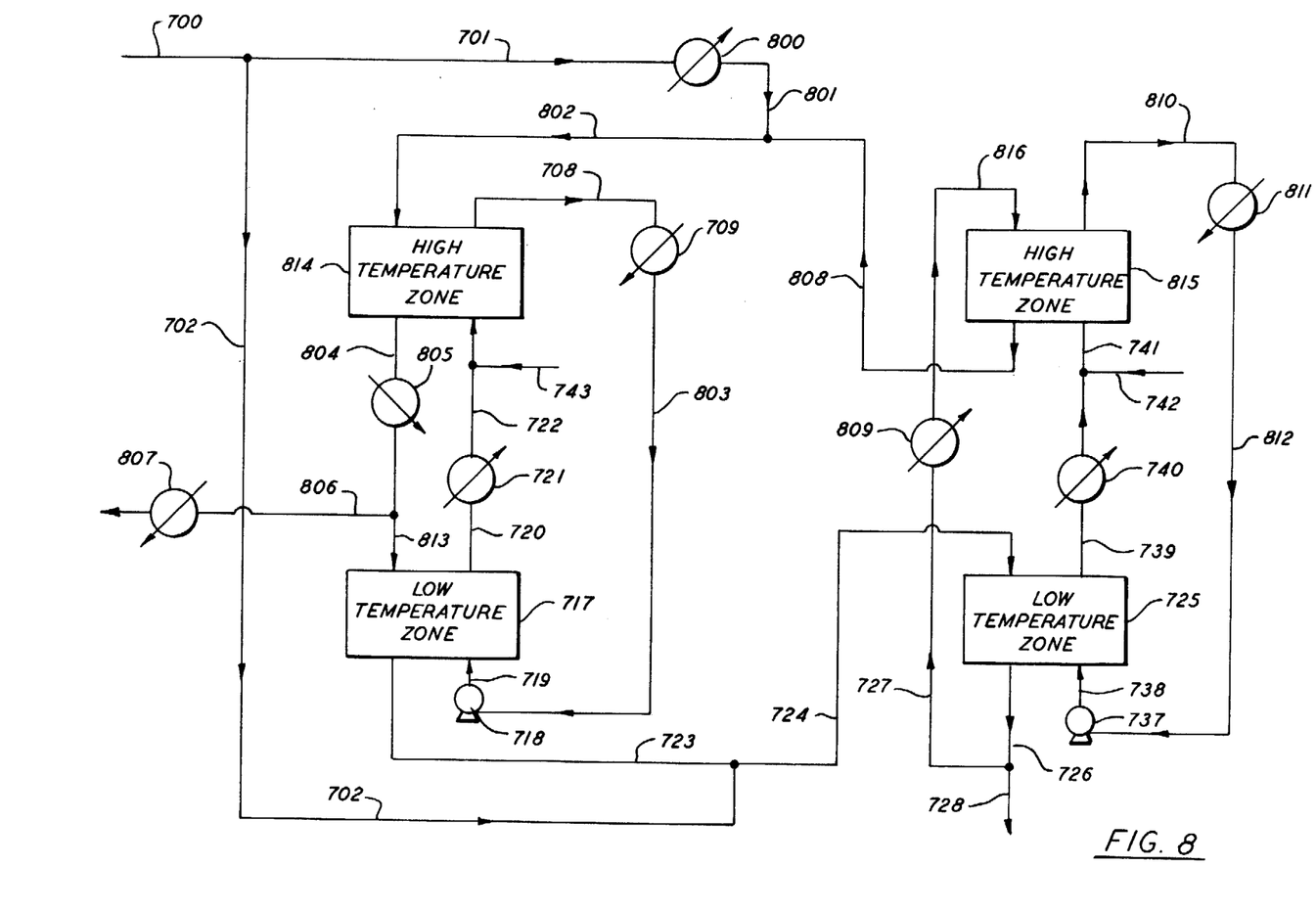
FIG. 8 is a two stage embodiment of the present invention comprising two high temperature zones and two low temperature zones as in FIG. 7. However the liquid water feed entering the high temperature zones contacts hydrogen gas in the liquid state at a temperature of about 100° C.

The process of FIG. 8 is similar to the process of FIG. 7 except that the feed water containing tritium in line 701 is first heated in preheater 800 and then led in line 801 to combine with water depleted in tritium from high temperature zone 815 in line 808. This combined water in line 802 is then introduced into high temperature zone 814 where it contacts hydrogen gas enriched in tritium in counter-current flow from line 722 at a temperature of about 100° C. in the presence of the hydrophobic catalyst previously described. The hydrogen gas enriched in tritium from high temperature zones 814 and 815 exits via lines 708 and 810, passes through condensors 709 and 811 and enters the first and second low temperature zones 717 and 725 via lines 803 and 812, compressors 718 and 737 and inlet lines 719 and 738. If desired gas/liquid separator arrangements as described with respect to FIG. 2 can be interposed between condensors 709 and 811 and lines 803 and 812 to separate water vapor depleted in tritium contained in the hydrogen gas enriched in tritium.

Water depleted in tritium from high temperature zone 814 is led in line 804 to cooler 805 and then split into lines 806 and 813. The water in line 813 enters low temperature zone 717 to contact hydrogen gas enriched in tritium. The water in line 806 can be further cooled in cooler 807 before leaving the process.

The liquid water enriched in tritium in line 727 is heated in preheater 809 before entering high temperature zone 815 via line 816 to contact hydrogen gas in counter-current flow at about 100° C. from line 741.

The multi-stage embodiment of the present invention may also be carried out by using combinations of high temperature zones wherein the liquid water enters one high temperature zone in the vapor state co-current to the hydrogen gas at temperatures between 225° C. and 300° C. and in another enters counter-current or co-current to the hydrogen gas in the liquid state at a temperature of about 100° C., or vice versa, in as many stages as necessary to achieve the desired separation.

EXAMPLE 1

Referring to FIG. 5, a liquid water feed having a tritium concentration of about $1\mu$ Ci/ml (microCurie/ml) at a temperature of about 20° C., and under a pressure of 1 to 10 psig is led in line 501 at a flow rate of 240 g./min whereafter it is split into lines 502 and 503. The liquid water in line 502 is vaporized and superheated in vaporizer 505 and at a flow rate of 120 g./min. is led to the high temperature zone 504 containing a fixed bed of catalyst comprising finely-divided platinum on alumina. The weight of catalyst is 260 gm. The water vapor is combined with the hydrogen gas depleted in tritium having a tritium concentration of $5.09\mu$ Ci/mole of gas from the low temperature zone 515 via line 518 at a flow rate of 1.48 g./min. in co-current flow and is passed over the catalyst at a temperature of about 250° C. at a weight hourly space velocity (WHSV) of about 28 hr.$^{-1}$ The gaseous mixture of water vapor depleted in tritium and hydrogen gas enriched in tritium is withdrawn from the high temperature zone 504 in line 519, condensed and separated to obtain a liquid water effluent in line 510 analyzing about $0.986\mu$ Ci/ml. The hydrogen gas enriched in tritium in line 511 containing $7.36\mu$ Ci/mole is introduced into the low temperature zone at a flow rate of 1.48 g./min. The tritium-enriched hydrogen gas is passed over a fixed bed of a catalyst comprising an alumina support having a first coating of polytetrafluoroethylene thereon and a second coating of polytetrafluoroethylene containing finely-divided platinum on carbon in counter-current flow to the liquid water feed in line 503 which enters the low temperature zone at a flow rate of 120 g./min. The weight of catalyst is 260 g. and the weight hourly space velocity is 28 hr.$^{-1}$ The low temperature zone is operated at about 25° C. and at a pressure of about 1–10 psig. The hydrogen gas now depleted to a tritium concentration of $5.09\mu$ Ci/mole is withdrawn from the low temperature zone via line 516, heated via the preheated 517 and introduced into the high temperature zone to meet incoming vaporized water feed from line 506. The liquid effluent is withdrawn from the low temperature zone in line 521 having a tritium concentration of about $1.014\mu$ Ci/ml.

EXAMPLE 2

The procedure of Example 1 was followed except that the flow rate of the hydrogen gas enriched in tritium in line 511 and the hydrogen gas depleted in tritium in line 518 is increased from 1.48 g./min to 53.3 g./min. As a result, the liquid water depleted in tritium in line 510 has a tritium concentration of $0.626\mu$ Ci/ml, the tritium content of the hydrogen gas enriched in tritium in line 511 is $4.68\mu$ Ci/mole; the tritium content of the hydrogen gas depleted in tritium from the low temperature zone 515 in line 516 is $3.00\mu$ Ci/mole, and the liquid water enriched in tritium in line 521 has a tritium concentration of $1.374\mu$ Ci/ml.

EXAMPLE 3

Referring to FIG. 7, a liquid water feed entering the process in line 700 is split into lines 701 and 702 each having a flow rate of 120 g./min and a tritium concentration of about $1\mu$ Ci/ml. The water in line 701 enters line 703 where it meets liquid water from separator 735 in line 704 having a flow rate of 240 g./min and a tritium concentration of $0.659\mu$ Ci/ml. The tritium concentration in line 703 is $0.772\mu$ Ci/ml. The combined tritiated liquid water in line 703 at a flow rate of 360 g./min is vaporized and superheated in vaporizer 705 and enters high temperature zone 707 to contact preheated hydrogen gas introduced at a flow rate of 90 g. moles/min from line 722 in co-current flow at 250° C. in the presence of a fixed bed of a catalyst comprising platinum on alumina. The tritium concentration of the hydrogen gas entering the high temperature zone is about $1.342\mu$ Ci/mole. The gases exit the high temperature zone 707 via line 708 and the water vapor contained therein is condensed in condensor 709. The mixture of hydrogen gas enriched in tritium and water depleted in tritium is separated in separator 711. The hydrogen gas enriched in tritium leaves the separator via line 712 and is led to the low temperature zone via compressor 718 and inlet line 719 at a flow rate of about 90 g. moles/min. The tritium concentration of the hydrogen gas enriched in tritium is $2.88\mu$ Ci/mole. The liquid water leaves the separator via line 713 and is split into lines 714 and 715. In line 714 the liquid water depleted in tritium leaves the system at a flow rate of 120 g./min and having a tritium concentration of $0.386\mu$ Ci/ml. The liquid water in line 715 also containing $0.386\mu$ Ci/ml enters low temperature zone 717 at a flow rate of 240 g./min and contacts the hydrogen gas enriched in tritium at a temperature of about 25° C. in counter-current flow in the presence of a fixed bed of a catalyst comprising an alumina support having a first coating of polytetrafluoroethylene and a second coating of polytetrafluoroethylene containing finely divided platinum on carbon. The liquid water exits the low temperature zone 717 in line 723 at a flow rate of 240 g./min and has a tritium concentration of about $0.965\mu$ Ci/ml. The tritium-enriched water in line 723 meets incoming feed water from line at 120 g./min in line 724 where the combined flow rate is 360 g./min. The tritium concentration at this point is about $0.977\mu$ Ci/ml. The liquid water in line 724 enters low temperature zone 725 and contacts hydrogen gas enriched in tritium at a tritium concentration of $4.92\mu$ Ci/mole from line 738 at a flow rate of 130 g.-moles/min in counter-current flow at 25° C. in the presence of the same hydrophobic catalyst employed in low temperature zone 717. The liquid water leaving the low temperature zone 725 in line 726 is split into lines 727 and 728. The liquid water fraction in line 728 is separated from the system at a flow rate of 120 g./min and contains $1.614\mu$ Ci/ml which is over a 60% enrichment in tritium relative to the starting liquid feed, $1.0\mu$ Ci/mole. The water fraction in line 727 at a flow rate of 240 g./min and a tritium concentration of $1.614\mu$ Ci/ml is vaporized in vaporizer 729 and is introduced into high temperature zone 731 in co-current flow to the hydrogen gas depleted in tritium from low temperature zone 725 which enters the zone via line 739, preheater 740 and line 741. The tritium concentration of the hydrogen gas introduced into zone 731 is about $3.08\mu$ Ci/mole. The tritium exchange between the water vapor and hydrogen gas takes place under the same conditions as in high temperature zone 707. After condensation in condenser 733 and gas/liquid separation in separator 735, hydrogen gas enriched in tritium at a tritium concentration of $4.92\mu$ Ci/mole is recycled to the low temperature zone 725 via line 736. The liquid water depleted in tritium at a tritium concentration of $0.659\mu$ Ci/ml. at a flow rate of 240 g./min exits the separator 735 in line 704 to encounter incoming feed water in line 701.

What is claimed is:

1. A process for exchanging isotopes of hydrogen between water and gaseous hydrogen comprising:
    (a) (i) introducing hydrogen gas depleted in said isotope, and water in the vapor phase, said water containing an isotope of hydrogen, into a first reaction zone, contacting in said zone in co-current flow at a temperature in the range of from about 225° C. to about 300° C. said water vapor and hydrogen gas with a supported metal catalyst, withdrawing from said zone an effluent stream comprising a mixture of hydrogen gas enriched in said isotope and water vapor depleted in said isotope, and condensing said water vapor to liquid water; or
    (a) (ii) introducing hydrogen gas depleted in said isotope and liquid phase water, said water containing an isotope of hydrogen, into a first reaction zone, contacting in said zone in counter-current flow at a temperature of about 100° C. said liquid phase water and hydrogen gas with a hydrophobic catalyst comprising a coherent film of a hydrophobic polymer, said film being disposed on a low surface area support and containing at least one finely divided catalytically active metal of Group VIII of the Periodic Table on a high surface area carrier and withdrawing from said first reaction zone a stream of hydrogen gas enriched in said isotopes and liquid water depleted in said isotope; and
    (b) introducing a hydrogen gas enriched in said isotope withdrawn from said first reaction zone and liquid water containing said isotope into a second reaction zone, contacting in said second reaction zone in counter-current flow at a temperature in the range from about 0° C. to about 50° C. said liquid water and said hydrogen gas enriched in said isotope with a hydrophobic catalyst comprising a coherent film of a hydrophobic polymer, said film being disposed on a low surface area support and containing at least one finely divided catalytically active metal of Group VIII of the Periodic Table on a high surface area carrier and withdrawing from said second reaction zone a liquid water effluent stream enriched in said isotope and a hydrogen gas depleted in said isotope.

2. The process of claim 1 wherein said hydrogen isotope is tritium.

3. The process of claim 1 wherein said hydrogen gas depleted in said isotope introduced into said first reaction zone comprises hydrogen gas depleted in said isotope withdrawn from said second reaction zone.

4. A process for exchanging tritium between water and gaseous hydrogen, which process comprises:
    (a) (i) introducing hydrogen gas depleted in tritium and water in the vapor phase, said water containing tritium, into a first reaction zone, contacting in said zone in co-current flow at a temperature in the range of from about 225° C. to about 300° C. said water vapor and hydrogen gas with a supported metal catalyst, withdrawing from said zone an effluent stream comprising a mixture of hydrogen gas enriched in tritium and water vapor depleted in tritium, and condensing said water vapor to liquid water; or
    (a) (ii) introducing hydrogen gas depleted in tritium and liquid phase water, said water containing tritium, into a first reaction zone, contacting in said zone in counter-current flow at a temperature of about 100° C. said liquid phase water and hydrogen gas with a hydrophobic catalyst comprising a coherent film of a hydrophobic polymer, said film being disposed on a low surface area support and containing at least one finely divided catalytically active metal of Group VIII of the Periodic Table on a high surface area carrier and withdrawing from said first reaction zone a stream of hydrogen gas enriched in tritium and liquid water depleted in tritium; and
    (b) introducing a hydrogen gas withdrawn from said first reaction zone and liquid water containing tritium into a second reaction zone, contacting in said second reaction zone in counter-current flow at a temperature in the range from about 0° C. to about 50° C. said liquid water and said hydrogen gas enriched in tritium with a hydrophobic catalyst comprising a coherent film of a hydrophobic polymer, said film being disposed on a low surface area support and containing at least one finely divided catalytically active metal of Group VIII of the Periodic Table on a high surface area carrier, and withdrawing from said second reaction zone a liquid water effluent stream enriched in tritium and a hydrogen gas depleted in tritium.

5. The process of claim 4 wherein said hydrogen gas depleted in tritium introduced into said first reaction zone comprises hydrogen gas depleted in tritium withdrawn from said second reaction zone.

6. The process of claim 4 wherein said liquid water introduced into said second reaction zone comprises at least a portion of the water depleted in tritium withdrawn from said first reaction zone.

7. The process of claim 4 wherein said feed water containing tritium introduced into said first reaction zone comprises at least a portion of the liquid water effluent stream enriched in tritium withdrawn from said second reaction zone.

8. The process of claim 4 wherein the supported metal catalyst comprises at least one catalytically active metal selected from Groups VI, VII and VIII of the Periodic Table on a substrate.

9. The process of claim 8 wherein said metal is selected from the group consisting of nickel, cobalt, iron, rhodium, palladium, osmium, tungsten, platinum, iridium, molybdenum and rhenium, and combinations thereof, and comprises from about 0.01 to 5% by weight of the substrate.

10. The process of claim 4 wherein the low surface area carriers of the hydrophobic catalyst in the second reaction zone and of the hydrophobic catalyst employed in the first reaction zone of step (a) (ii) have a surface area of no greater than 5 m²/g.

11. The process of claim 4 wherein the high surface area carriers of the hydrophobic catalyst in the second reaction zone and of the hydrophobic catalyst employed in the first reaction zone of step (a) (ii) have a surface area of at least 50 m²/g.

12. The process of claim 4 wherein the hydrophobic polymers of the hydrophobic catalyst in the second reaction zone and of the hydrophobic catalyst employed in the first reaction zone of step (a) (ii) are selected from the group consisting of polytetrafluoroethylene, polyalkyl silicones, polyethylene and polypropylene.

13. The process of claim 4 wherein the Group VIII metals of the hydrophobic catalyst in the second reaction zone and of the hydrophobic catalyst employed in the first reaction zone step (a) (ii) are selected from the group consisting of platinum, nickel, iridium and rhodium, and combinations thereof, said metals comprising from 0.02 to 5.0% by weight of the catalyst.

14. The process of claim 4 wherein the hydrophobic catalyst in the second reaction zone and the hydrophobic catalyst employed in the first reaction zone of step (a)(ii) comprises a low surface area support having a surface area of less than about 5 square meters per gram, a first coherent film of a hydrophobic polymer disposed on said low surface area support, and a second coherent film of a hydrophobic polymer coated on said first film, said second film containing at least one finely-divided catalytically active metal of Group VIII of the Periodic Table disposed on a high surface area carrier having a surface area of at least about 50 square meters per gram.

15. The process of claim 14 wherein the hydrophobic polymer is selected from the group consisting of polytetrafluoroethylene, polyalkyl silicones, polyethylene and polypropylene.

16. The process of claim 14 wherein the Group VIII metal of said hydrophobic catalyst is selected from the group consisting of platinum, nickel, iridium and rhodium, and combinations thereof.

17. The process of claim 14 wherein the metal of Group VIII of the hydrophobic catalyst comprises from 0.02 to 5.0% by weight of the catalyst.

18. The process of claim 14 wherein the hydrophobic catalyst comprises alumina containing a first film of polytetrafluoroethylene thereon and a second film of polytetrafluoroethylene on said first film, said second film containing finely divided platinum on carbon.

19. The process of claim 4 wherein the hydrophobic catalyst employed in the second zone is the same as the hydrophobic catalyst in the first reaction zone of step (a) (ii).

20. The process of claim 4 wherein the hydrophobic catalyst employed in the second zone is different from the hydrophobic catalyst in the first zone of step (a) (ii).

21. A process for exchanging tritium between water and gaseous hydrogen comprising:
(a) (i) introducing hydrogen gas depleted in tritium, and water in the vapor phase, said water containing tritium, into a first reaction zone, contacting in said zone in co-current flow at a temperature in the range of from about 225° C. to about 300° C. said water vapor and hydrogen gas with a supported metal catalyst, comprising at least one catalytically active metal selected from Groups VI, VII and VIII of the Periodic Table on a substrate, withdrawing from said zone an effluent stream comprising a mixture of hydrogen gas enriched in tritium and water vapor depleted in tritium, and condensing said water vapor to liquid water; or
(a) (ii) introducing hydrogen gas depleted in tritium, and liquid phase water, said water containing tritium, into a first reaction zone, contacting in said zone in counter-current flow at a temperature of about 100° C. said liquid phase water and hydrogen gas with a hydrophobic catalyst comprising a coherent film of a hydrophobic polymer, said film being disposed on a low surface area support and containing at least one finely divided catalytically active metal of Group VIII of the Periodic Table on a high surface area carrier and withdrawing from said first reaction zone a stream of hydrogen gas enriched in tritium and liquid water depleted in tritium; and
(b) introducing a hydrogen gas enriched in tritium withdrawn from said first reaction zone and liquid water containing tritium into a second reaction zone, contacting in said second reaction zone in counter-current flow at a temperature in the range from about 0° C. to about 50° C. said liquid water and said hydrogen gas enriched in tritium with a hydrophobic catalyst comprising a low surface area support having a surface area of less than about 5 square meters per gram, a first coherent film of a hydrophobic polymer disposed on said low surface area support, and a second coherent film of a hydrophobic polymer coated on to said first film, said second film containing at least one finely divided catalytically active metal of Group VIII of the Periodic Table disposed on a particulate carrier having a surface area of at least about 50 square meters per gram, and withdrawing from said second reaction zone a liquid water effluent stream enriched in tritium and a hydrogen gas depleted in tritium.

22. The process of claim 21 wherein said hydrogen gas depleted in tritium introduced into said first reaction zone comprises hydrogen gas depleted in tritium withdrawn from said first reaction zone.

23. The process of claim 21 wherein the liquid water containing tritium introduced into said second reaction zone comprises at least a portion of the water depleted in tritium withdrawn from said first reaction zone.

24. The process of claim 21 wherein said water containing tritium introduced into said first reaction zone comprises at least a portion of the liquid water effluent enriched in tritium from said second reaction zone.

25. The process of claim 21 wherein said metal of said supported metal catalyst is selected from the group consisting of nickel, cobalt, iron, rhodium, palladium, osmium, tungsten, platinum, iridium, molybdenum and rhenium, and combinations thereof, said metal comprising from about 0.01 to 5% by weight of the support.

26. The process of claim 21 wherein the hydrophobic polymers of the hydrophobic catalyst used in the second reaction zone and in the first reaction zone of step (a) (ii) are selected from the group consisting of polytetrafluoroethylene, polyalkyl silicones, polyethylene and polypropylene.

27. The process of claim 21 wherein the Group VIII metals of the hydrophobic catalyst used in the second reaction zone and in the first reaction zone of step (a) (ii) are selected from the group consisting of platinum, nickel, iridium and rhodium, and combinations thereof, comprising from 0.02 to 5.0% of the weight of the catalyst.

28. The process of claim 21 wherein the hydrophobic catalyst used in the second reaction zone and in the first reaction zone of step (a) (ii) comprises alumina containing a first film of polytetrafluoroethylene, a second film of polytetrafluoroethylene on said first film, said second film containing finely divided platinum on carbon.

29. A process for exchanging tritium between gaseous hydrogen and water comprising:
(a) (i) introducing hydrogen gas depleted in tritium, and feed water in the vapor phase, said water containing tritium, into a first reaction zone, contacting in said zone in co-current flow at a temperature in the range of from about 225° C. to about 300° C. said water vapor and hydrogen gas with a catalyst, comprising at least one catalytically active metal selected from Groups VI, VII and VIII of the Periodic Table on a substrate, withdrawing from said zone an effluent stream comprising a mixture of hydrogen gas enriched in tritium and water vapor depleted in tritium, and condensing said water vapor to liquid water; or
(a) (ii) introducing hydrogen gas depleted in tritium, and liquid phase feed water, said water containing tritium, into a first reaction zone, contacting in said zone in counter-current flow at a temperature of about 100° C. said liquid phase water and hydrogen gas with a hydrophobic catalyst comprising a low surface area support having a surface area of less than about 5 square meters per gram, a first coherent film of a hydrophobic polymer disposed on said low surface area support, and a second coherent film of a hydrophobic polymer coated onto said first film, said second film containing at least one finely divided catalytically active metal of Group VIII of the Periodic Table disposed on a particular carrier having a surface area of at least about 50 square meters per gram, and withdrawing from said first reaction zone a stream of hydrogen gas enriched in tritium and liquid water depleted in tritium; and
(b) introducing said hydrogen gas enriched in tritium and a portion of said liquid water depleted in tritium from said first reaction zone into a second reaction zone, the remaining water depleted in tritium being withdrawn from the process, contacting in said second reaction zone in counter-current flow at a temperature in the range from about 0° C. to about 50° C. said portion of liquid water and said hydrogen gas enriched in tritium with a hydrophobic catalyst comprising a low surface area support having a surface area of less than about 5 square meters per gram, a first coherent film of a hydrophobic polymer disposed on said low surface area support, and a second coherent film of a hydrophobic polymer coated on to said first film, said second film containing at least one finely divided catalytically active metal of Group VIII of the Periodic Table disposed on a particulate high surface area carrier having a surface area of at least about 50 square meters per gram and withdrawing from said second reaction zone a liquid water effluent stream enriched in tritium and a hydrogen gas depleted in tritium.

30. A process for exchanging tritium between gaseous hydrogen and water comprising;
(a) (i) introducing hydrogen gas depleted in tritium, and a first portion of feed water in the vapor phase, said water containing tritium into a first reaction zone, contacting in said zone in co-current flow at a temperature in the range of from about 225° C. to about 300° C. said, first portion of vapor phase feed water and said hydrogen gas with a catalyst comprising at least one catalytically active metal selected from Groups VI, VII and VIII of the Periodic Table on a substrate, withdrawing from said zone an effluent stream comprising a mixture of hydrogen gas enriched in tritium and water vapor depleted in tritium, and condensing said water vapor to liquid water depleted in tritium; or
(a) (ii) introducing hydrogen gas depleted in tritium, and a first portion of liquid phase feed water, said water containing tritium, into a first reaction zone, contacting in said zone in counter-current flow at a temperature of about 100° C. said first portion of liquid phase water and said hydrogen gas depleted in tritium with a hydrophobic catalyst comprising a low surface area support having a surface area of less than about 5 square meters per gram, a first coherent film of a hydrophobic polymer disposed on said low surface area support, and a second coherent film of a hydrophobic polymer coated onto said first film, said second film containing at least one finely divided catalytically active metal of Group VIII of the Periodic Table disposed on a particulate high surface area carrier having a surface area of at least about 50 square meters per grams and withdrawing from said first reaction zone a stream of hydrogen gas enriched in tritium and liquid water depleted in tritium and
(b) introducing said hydrogen gas enriched in tritium withdrawn from said first reaction zone and a second portion of said feed water containing tritium into a second reaction zone, contacting in said second reaction zone in counter-current flow at a temperature in the range of from about 0° C. to 50° C. said second portion of liquid water and said hydrogen gas enriched in tritium with a hydrophobic catalyst comprising a low surface area support having a surface area of less than about 5 square meters per gram, a first coherent film of a hydrophobic polymer disposed on said low surface area support, and a second coherent film of a hydrophobic polymer coated onto said first film, said second film containing at least one finely divided catalytically active metal of Group VIII of the Periodic Table disposed on a particulate high surface area carrier having a surface area of at least about 50 square meters per gram and withdrawing from said second reaction zone a liquid water effluent stream enriched in tritium and a hydrogen gas depleted in tritium.

31. A process for exchanging tritium between water and gaseous hydrogen comprising;
(a) introducing a hydrogen gas enriched in tritium, and feed water in the liquid phase, said water containing tritium into a first reaction zone, contacting in said first reaction zone in counter-current flow at a temperature in the range of from about 0° C. to about 50° C. said liquid water and said hydrogen gas enriched in tritium with a hydrophobic catalyst comprising a low surface area support having a surface area of less than about 5 square meters per gram, a first coherent film of a hydrophobic polymer disposed on said low surface area support, and a second coherent film of a hydrophobic polymer coated onto said first film, said second film containing at least one finely divided catalytically active metal of Group VIII of the Periodic Table disposed on a particulate high surface area carrier having a surface area of at least about 50 square meters per gram and withdrawing from said first reaction zone a liquid water effluent stream enriched in tritium and a hydrogen gas depleted in tritium; and
(b) (i) introducing said hydrogen gas depleted in tritium withdrawn from said reaction zone and a portion of said liquid water effluent enriched in tritium in the vapor phase, into a second reaction zone, the remaining portion of liquid water effluent enriched in tritium being separated from the process, contacting in said zone in co-current flow at a temperature in the range of from about 225° C. to about 300° C. said portion of water vapor and said hydrogen gas depleted in tritium with a catalyst comprising at least one finely divided metal selected from Groups VI, VII and VIII of the Periodic Table on a substrate, withdrawing from said zone an effluent comprising a mixture of hydrogen gas enriched in tritium and water vapor depleted in tritium; and condensing said water vapor to liquid water; or
(b) (ii) introducing said hydrogen gas depleted in tritium and a portion of said liquid water effluent enriched in tritium withdrawn from said first reaction zone into a second reaction zone, the remaining portion of said liquid water effluent being separated from the process, contacting in said zone in counter-current flow at a temperature of about 100° C., said liquid phase water portion and said hydrogen gas depleted in tritium with a hydrophobic catalyst comprising a low surface area support having a surface area of less than about 5 square meters per gram, a first coherent film of a hydrophobic polymer disposed on said low surface area support, and a second coherent film of a hydrophobic polymer coated onto said first film, said second film containing at least one finely divided catalytically active metal of Group VIII of the Periodic Table disposed on a particulate high surface area carrier having a surface area of at least about 50 square meters per gram and withdrawing from said second reaction zone a stream of hydrogen gas enriched in tritium and liquid water depleted in tritium.

32. A process for exchanging tritium between gaseous hydrogen and water and comprising;
(a) (i) introducing a first hydrogen gas depleted in tritium withdrawn from a second reaction zone, a first portion of feed water in the vapor phase, said water containing tritium, and a third liquid water fraction depleted in tritium withdrawn from a fourth reaction zone in the vapor phase into a first reaction zone, contacting in said zone in co-current flow at a temperature in the range of from about 225° C. to about 300° C. said first water vapor portion, said third liquid water fraction in the vapor phase and said first hydrogen gas depleted in tritium with a catalyst comprising at least one catalytically active metal selected from Groups VI, VII and VIII of the Periodic Table on a substrate, withdrawing from said zone an effluent stream comprising a mixture of a first hydrogen gas enriched in tritium and a first water vapor fraction depleted in tritium and condensing said first water vapor fraction to a first liquid water fraction depleted in tritium; or
(a) (ii) introducing a first hydrogen gas depleted in tritium withdrawn from second reaction zone, a first portion of feed water in the liquid phase, said water containing tritium, and a third liquid water fraction depleted in tritium withdrawn from a fourth reaction zone into a first reaction zone, contacting in said first zone in counter-current flow at a temperature of about 100° C. said first portion of liquid phase water, said third liquid water fraction and said first hydrogen gas depleted in tritium with a hydrophobic catalyst comprising a low surface area support having a surface area of less than about 5 square meters per gram, a first coherent film of a hydrophobic polymer disposed on said low surface area support, and a second coherent film of a hydrophobic polymer coated onto said first film, said second film containing at least one finely divided catalytically active metal of Group VIII of the Periodic Table disposed on a particulate carrier having a surface area of at least about 50 square meters per gram, and withdrawing from said first reaction zone a stream of a first hydrogen gas enriched in tritium and a first liquid water fraction depleted in tritium;
(b) introducing said first hydrogen gas enriched in tritium withdrawn from said first reaction zone and a portion of said first liquid water fraction depleted in tritium into a second reaction zone, the remaining portion of said first liquid water fraction depleted in tritium being separated from the process, contacting in said second reaction zone in counter-current flow at a temperature in the range from about 0° C. to 50° C. said portion of said first liquid water fraction depleted in tritium and said first hydrogen gas enriched in tritium with a hydrophobic catalyst comprising a low surface area support having a surface area of less than about 5 square meters per gram, a first coherent film of a hydrophobic polymer disposed on said low surface area support, and a second coherent film of a hydrophobic polymer coated onto said first film, said second film containing at least one finely divided catalytically active metal of Group VIII of the Periodic Table disposed on a particulate high surface area carrier having a surface area of at least about 50 square meters per gram and withdrawing from said second reaction zone a first liquid water fraction enriched in tritium and said first hydrogen gas depleted in tritium;

(c) introducing a second hydrogen gas enriched in tritium withdrawn from a fourth reaction zone, a second portion of feed water in the liquid phase, said water containing tritium, and said first liquid water fraction enriched in tritium withdrawn from said second reaction zone into a third reaction zone, contacting in said third zone in counter-current flow at a temperature in the range of from 0° C. to 50° C. said feed water portion, said first liquid water fraction enriched in tritium and said second hydrogen gas enriched in tritium with a hydrophobic catalyst comprising a low surface area support having a surface area of less than about 5 square meters per gram, a first coherent film of a hydrophobic polymer disposed on said low surface area support, and a second coherent film of a hydrophobic polymer coated onto said first film, said second film containing at least one finely divided catalytically active metal of Group VIII of the Periodic Table disposed on a particulate high surface area carrier having a surface area of at least about 50 square meters per gram, and withdrawing from said third reaction zone a second liquid water fraction enriched in tritium and a second hydrogen gas depleted in tritium; and (d) (i) introducing said second hydrogen gas depleted in tritium withdrawn from said third zone and a first portion of said second liquid water fraction enriched in tritium in the vapor phase into a fourth reaction zone, the remaining portion of said second liquid water fraction enriched in tritium being separated from the process, introducing in said fourth zone in co-current flow at a temperature in the range of from about 225° C. to 300° C. said first portion of said second liquid water fraction in the vapor phase, with a catalyst comprising at least one catalytically active metal selected from Group VI, VII and VIII of the Periodic Table on a substrate, withdrawing from said fourth zone an effluent stream comprising a mixture of a said second hydrogen gas enriched in tritium, and a third water vapor fraction depleted in tritium, and condensing said third water vapor fraction depleted in tritium to a third liquid water fraction depleted in tritium; or (d) (ii) introducing a said second hydrogen gas depleted in tritium withdrawn from said third zone and a first portion of said second liquid water fraction depleted in tritium into a fourth reaction zone, contacting in said fourth zone in counter-current flow at a temperature of about 100° C. said first portion of said second liquid water fraction depleted in tritium and said second hydrogen gas depleted in tritium with a hydrophobic catalyst comprising a low surface area support having a surface area of less than about 5 square meters per gram, a first coherent film of a hydrophobic polymer disposed on said low surface area support, and a second coherent film of a hydrophobic polymer coated onto said first film said second film containing at least one finely divided catalytically active metal of Group VIII of the Periodic Table disposed on a particulate low surface area carrier having a surface area of at least about 50 square meters per gram and withdrawing from said fourth reaction zone a stream of said second hydrogen gas enriched in tritium and a third liquid water fraction depleted in tritium.

* * * * *